United States Patent
Bethke et al.

(12)

(10) Patent No.: US 6,415,906 B2
(45) Date of Patent: Jul. 9, 2002

(54) METHOD AND APPARATUS FOR TRANSFERRING PALLETS AROUND AN END TERMINAL IN A CONVEYOR ASSEMBLY

(75) Inventors: Scott P. Bethke, Howell; Brian R. Dana, Corunna; Frank A. Stone, Macomb Township, all of MI (US)

(73) Assignee: Inno-veyor, Inc., Livonia, MI (US)

( * ) Notice: Subject to any disclaimer, the term of this patent is extended or adjusted under 35 U.S.C. 154(b) by 0 days.

(21) Appl. No.: 09/815,425

(22) Filed: Mar. 22, 2001

Related U.S. Application Data

(60) Provisional application No. 60/194,653, filed on Apr. 4, 2000.

(51) Int. Cl.$^7$ .............................................. B65G 15/00
(52) U.S. Cl. .................................. 198/465.1; 198/343.1
(58) Field of Search .......................... 198/343.1, 345.3, 198/343.2, 465.1, 795

(56) References Cited

U.S. PATENT DOCUMENTS

| | | | | |
|---|---|---|---|---|
| 5,220,996 A | * | 6/1993 | Noestheden | 198/465.1 |
| 5,388,684 A | * | 2/1995 | Peck | 198/465.1 |
| 5,735,384 A | * | 4/1998 | Lingo et al. | 198/465.1 |
| 6,047,813 A | | 4/2000 | Herzog et al. | |

* cited by examiner

*Primary Examiner*—James R. Bidwell
(74) *Attorney, Agent, or Firm*—Brooks & Kushman P.C.

(57) ABSTRACT

An endless roller chain conveyor of the over/under type supporting carriers or pallets which independently travel along the horizontal runs of the conveyor upon demand, while the roller chain is allowed to continuously run at a constant speed. The chains are multi-strand roller chains. The carriers or pallets may be stopped and held along the horizontal runs of the conveyor (both top and bottom) using mechanically driven stop assemblies located at required load, unload, holdback, or workstation positions assigned to the particular application. The carriers or pallets are driven on the roller chains by way of guide sprockets, alignment bars, and support rollers. The guide sprockets are attached to an adjustable clutch assembly of the type which allows for adjustment of the rolling resistance to accommodate the particular load requirements of the specific application for a particular machine. When the carriers or pallets are allowed to advance on the upper level from the last stop position (unload) to travel around the end sprockets (lowering the carrier or pallet from the upper level to the lower level) or allowed to advance from the lower last stop position (holdback) around the end sprockets (raising the carrier or pallet from the lower level to the upper level) this is accomplished by means of positive mechanical engagement of the carrier or pallet through the end transitions.

14 Claims, 5 Drawing Sheets

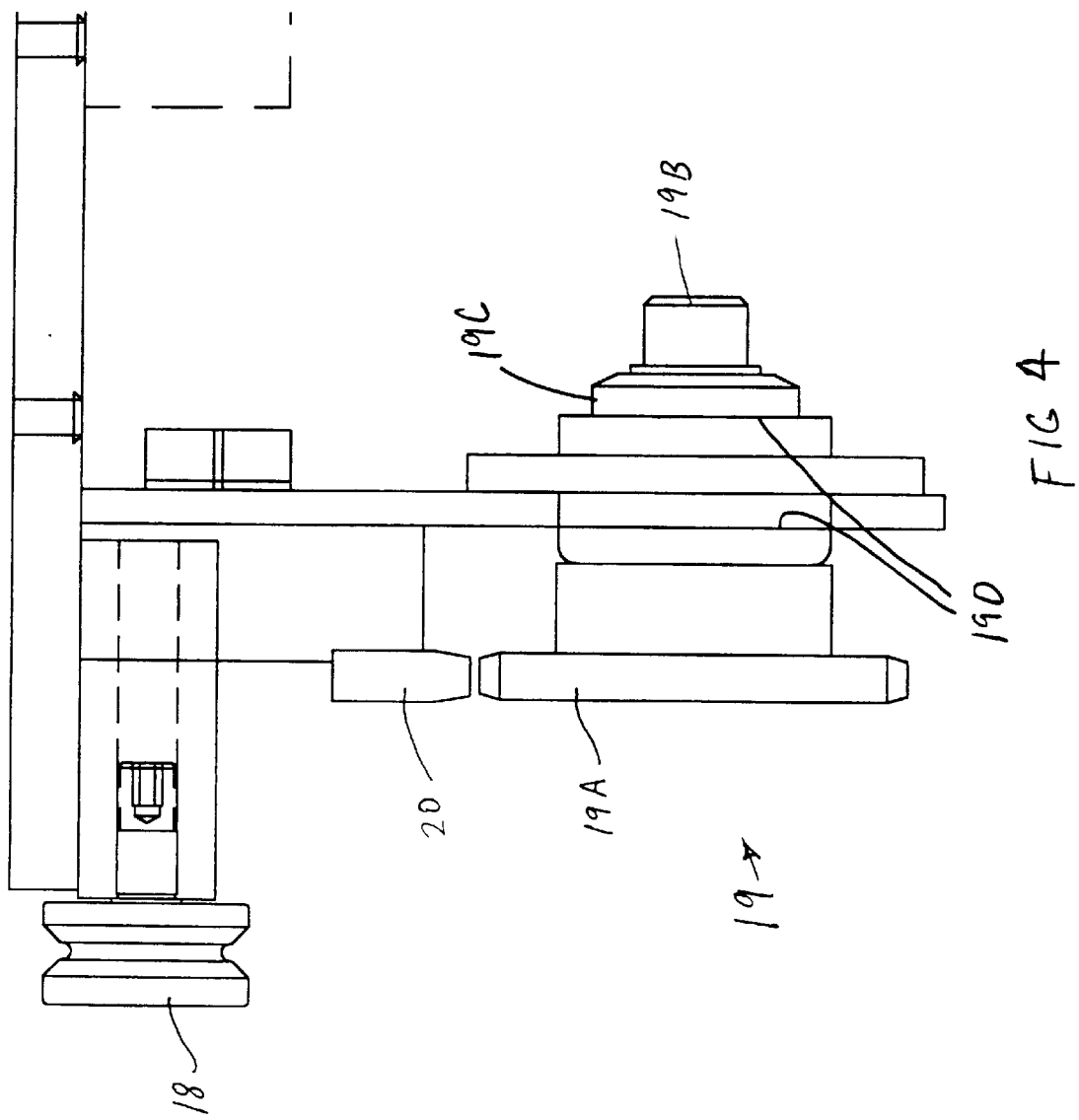

METHOD AND APPARATUS FOR TRANSFERRING PALLETS AROUND AN END TERMINAL IN A CONVEYOR ASSEMBLY

CROSS-REFERENCE TO RELATED APPLICATIONS

This application claims the benefit of U.S. provisional application Ser. No. 60/194,653, filed Apr. 4, 2000.

BACKGROUND OF THE INVENTION

1. Field of the Invention

The present invention relates to a method and apparatus for transferring pallets around an end terminal in a conveyor assembly, which includes a roller disc secured to a sprocket so that a clutch sprocket of the pallet is trapped between the roller disc and a multi-strand chain at the end terminal for pallet transfer.

2. Background Art

Prior art conveyor assemblies rely upon friction devices, such as pressure rollers, friction discs, wedge-type discs, or spring-loaded wedge plates, for transferring pallets around a terminal end of a conveyor. These devices are subject to wear because the load is primarily supported by a friction interface, and the interface itself is subject to wear.

As the weight of the carriers or pallets increases due to the size of each and the weight of the attached tooling, which often includes nest fixtures, as well as the hinging of multiple pallets to create a pallet train, the subject wear of those designs relying on friction becomes much more critical. When wear occurs, the carriers or pallets may slip while being transferred around a sprocket at a terminal end of a conveyor chain, which may result in the slamming of pallets after the slippage, or may result in the carriers or pallets not having sufficient frictional engagement to travel through the terminal end to raise the carrier or pallet from the lower level to the upper level of the conveyor.

Accordingly, it is desirable to provide an improved conveyor assembly in which pallets or carriers may be transferred around a sprocket at a terminal end of the conveyor assembly without relying upon frictional engagement, while maintaining ability of pallets to stop and accumulate along horizontal runs of the conveyor at dedicated stop stations as the endless chain continues to rotate.

DISCLOSURE OF THE INVENTION

The present invention overcomes the limitations of prior designs and provides the user of the invention a positive transfer of carriers or pallets on either terminal end of a conveyor using a rolling sprocket mechanically trapped between rotating roller chain rollers. The invention eliminates the concern over wear restrictions thereby increasing the load carrying capacity of the carrier or pallets.

The carrier or pallets are fitted with sprockets which provide resistance to the chains by means of adjustable clutches and alignment bars which prevent skewing of the carrier or pallets beyond an acceptable tolerance. The sprockets are engaged on the bottom side of the upper multi-strand roller chain and the alignment bars are riding on the top side of the upper multi-strand roller chain.

The multi-strand roller chain is driven by a pair of drive sprockets located at the drive end of the conveyor. At the opposing end of the conveyor similar sprockets act as idler and/or take-up sprockets to allow for proper tensioning of the multi-strand roller chain.

Attached to each sprocket is a disc containing rollers of like type and material as the multi-strand roller chain. The disc maintains a matching pitch of the driven and the idler sprockets. The distance between the circumferential pitch diameter of either type of sprocket and the roller disc is such to allow for the carrier or pallet sprocket to become "trapped" between the two during the transfer around the terminal ends of the conveyor.

Accordingly, an object of the invention is to provide an improved method and apparatus for transferring pallets around a sprocket at a terminal end of a conveyor assembly in a manner which eliminates the reliance upon frictional engagement for the end transfer, and in a configuration which maintains the ability of the pallets to stop and accumulate along the horizontal runs of the conveyor at dedicated stop stations while the chain is continuously moving.

The above object and other objects, features and advantages of the present invention are readily apparent from the following detailed description of the best modes for carrying out the invention when taken in connection with the accompanying drawings.

BRIEF DESCRIPTION OF THE DRAWINGS

FIG. 4 shows a schematically arranged partial end view of a pallet including a clutch/sprocket assembly, guidance bars and carrying rollers in accordance with the invention;

DETAILED DESCRIPTION OF THE PREFERRED EMBODIMENT(S)

In the following detailed description, certain specific terminology will be employed for the sake of clarity and a particular embodiment in accordance with 35 U.S.C. § 112, but it is understood that the same is not intended to be limiting and should not be so construed inasmuch as the invention is capable of taking many forms and variations within the scope of the appended claims.

Figure 1:
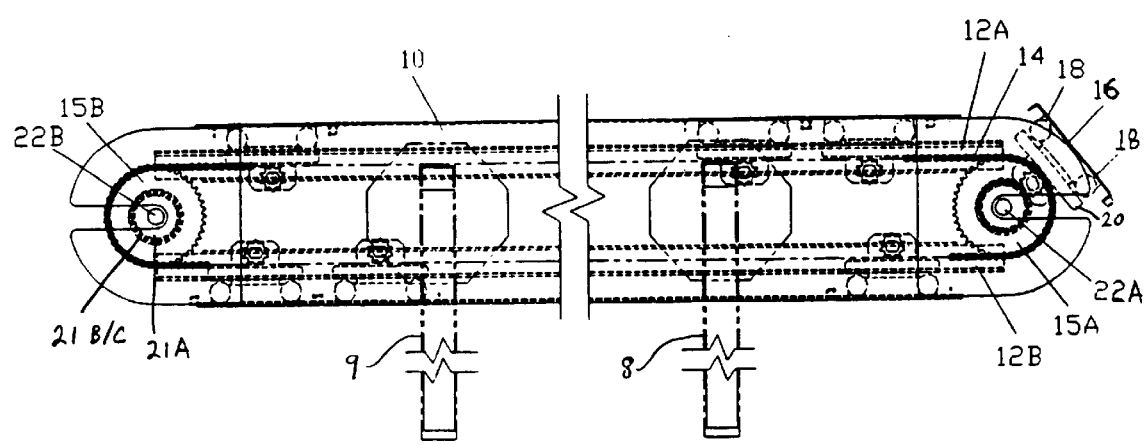
FIG. 1 is a side elevation view of an over/under chain driven accumulating pallet conveyor according to the present invention.
Figure 2:
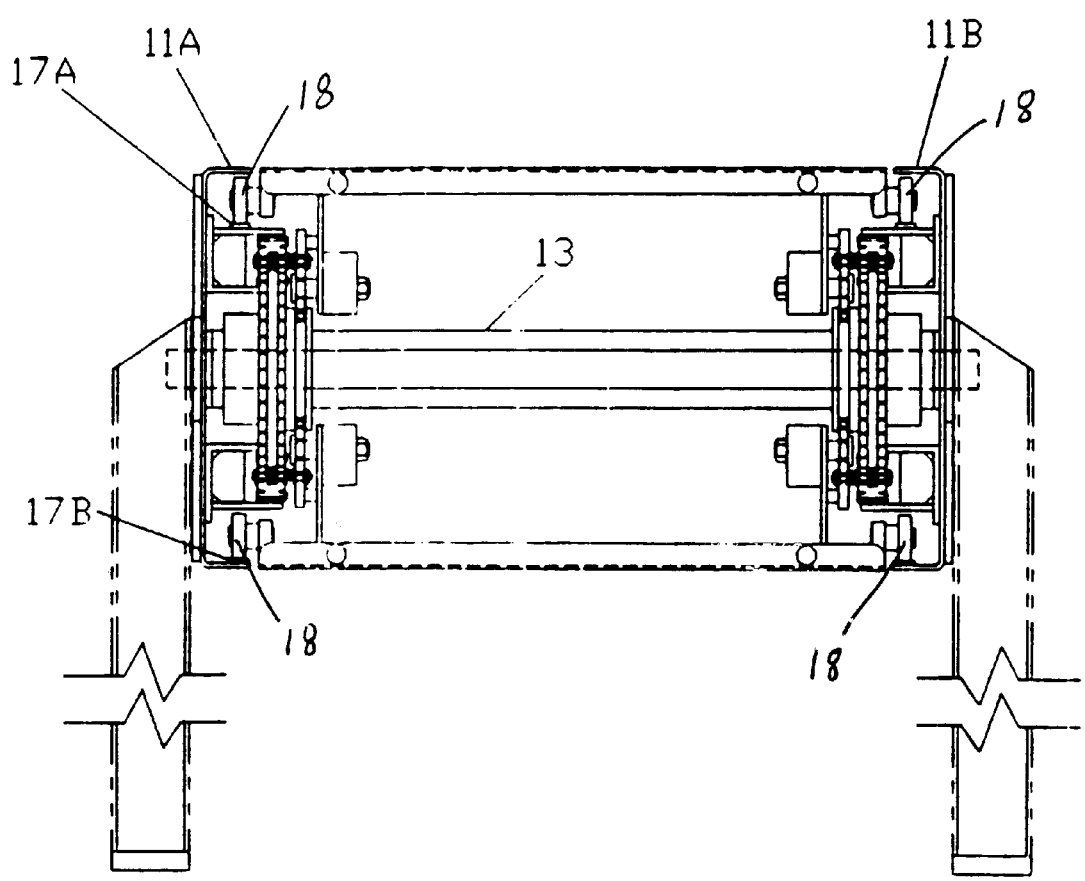
FIG. 2 is an end view of the drive terminal end of the conveyor of FIG. 1.
Figure 3:
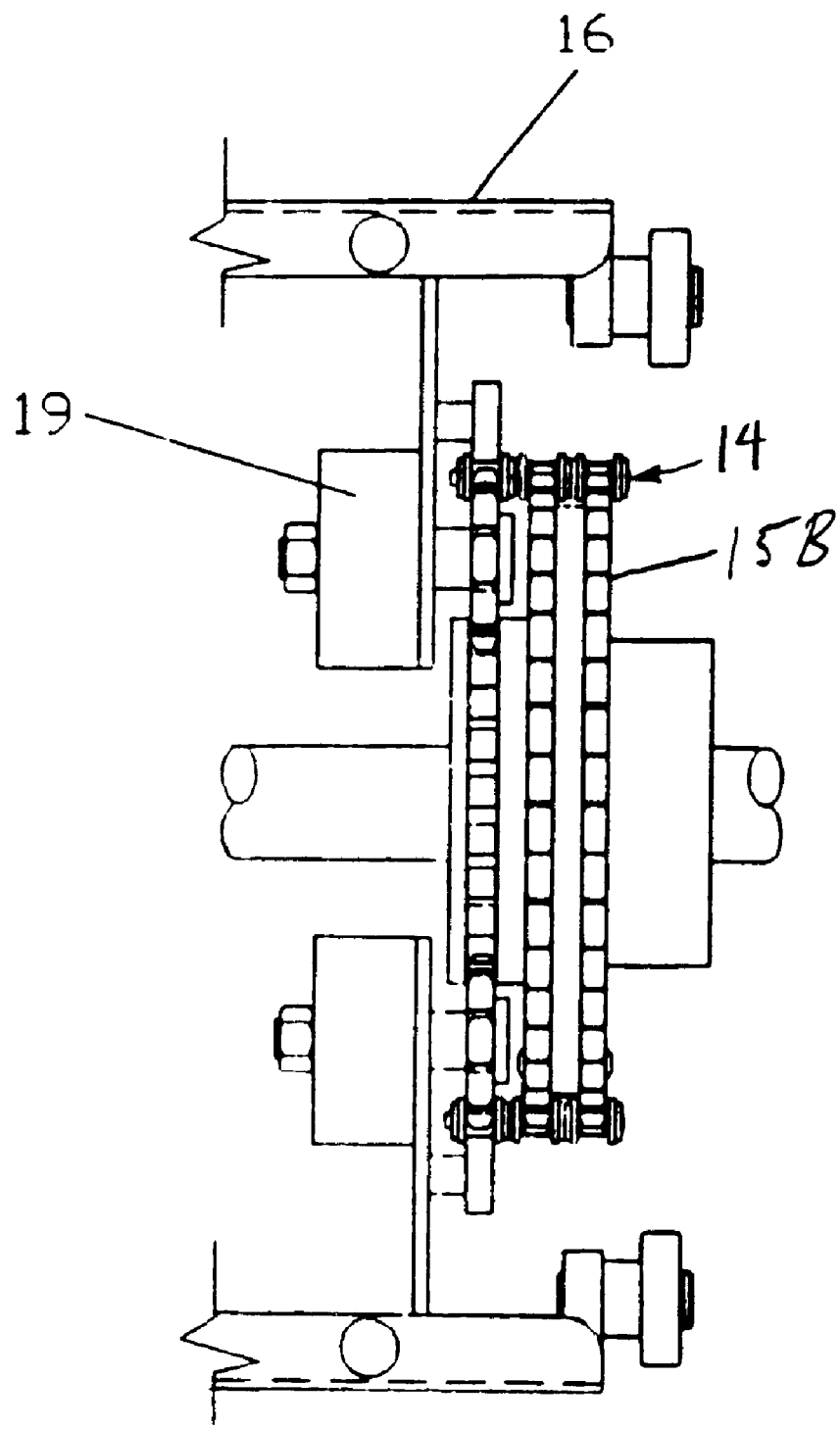
FIG. 3 is an enlarged end view of the drive terminal end of the conveyor taken from FIG. 2.
Figure 5A:
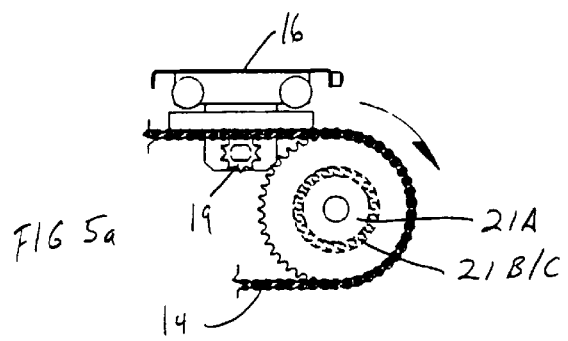
FIGS. 5a–d show sequential partial side views of engagement of a clutch sprocket between a drive chain and a roller disc through the terminal end of a conveyor in accordance with the present invention.
Figure 5B:
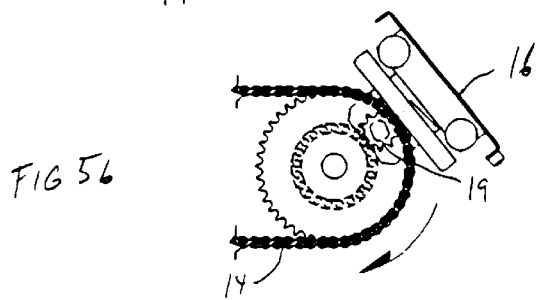
Figure 5C:
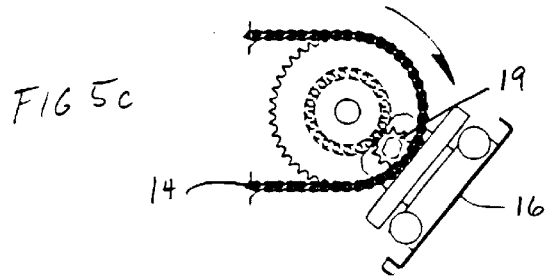
Figure 5D:
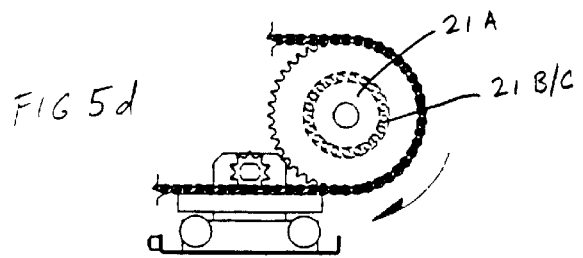
Figure 6A:
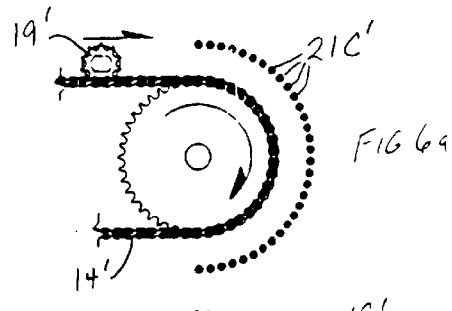
FIGS. 6a–d show sequential partial side views of the engagement of a clutch sprocket between a drive chain and a roller disc, schematically, through a terminal end of a conveyor in accordance with an alternative embodiment of the invention.
Figure 6B:
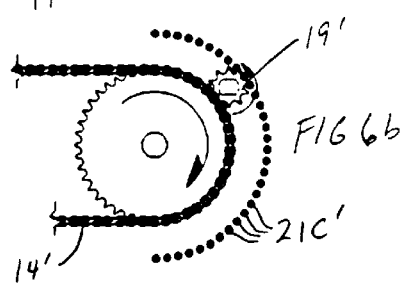
Figure 6C:
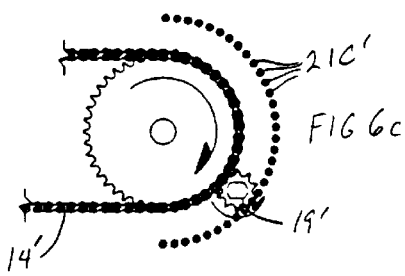
Figure 6D:
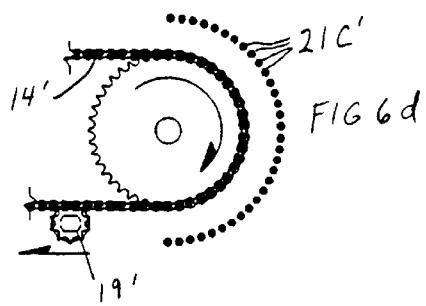

Referring to the drawings, FIGS. 1–3 illustrate a conveyor 10 according to the present invention, which includes the conveyor side frames (11A, 11B), multi-strand roller chain support and guide rails (12A, 12B), conveyor cross members 13, multi-strand roller chain 14, terminal roller chain sprockets (15A, 15B) at opposing ends of the conveyor 10, shafts (22A, 22B), and pallet assemblies 16. The conveyor 10 also includes a loading station 8 and an unloading station 9, where the pallets are loaded and unloaded, respectively.

Each of the roller chain guide rails (12A, 12B) incorporate a runner bar (17A, 17B) upon which the pallet guide rollers 18 travel along the horizontal runs of the conveyor. The wheels 18 transport the majority of weight load of the pallet, which reduces the carrying load of the multi-strand roller chain 14.

Refer to FIG. 4 for illustration of the clutch/sprocket assembly 19, the roller chain guide bar 20, and the pallet wheels 18. The sprocket assembly 19 consists of the sprocket 19A, sprocket shaft 19B, and a nut 19C which is operative to adjust forces applied to the frictional rubbing interfaces 19D of the clutch/sprocket assembly 19. The wheels 18 may be v-groove wheels to maintain pallet position.

Refer to FIGS. 5a–d for illustration of the clutch/sprocket assembly 19 engaged between the multi-strand roller chain 14, and the roller chain disc assemblies 21. FIGS. 6a–d illustrate engagement of a clutch/sprocket assembly 19' between a roller chain 14' and rollers 21C' of a roller disc assembly in accordance with an alternative embodiment of the invention.

FIGS. 5a–d illustrate the sequential engagement motion of the clutch/sprocket 19 between the roller chain 14 and the roller chain disc assembly 21. In these Figures, the roller chain disc assembly is more clearly shown detailing the disc body 21A, roller pins 21B, and the rollers 21C.

As the pallet assemblies 16 are entering the terminal end of the conveyor 10, the clutch/sprocket assemblies 19 are engaged in the multi-strand roller chain 14 and become entrapped between the roller chain 14 and the roller disc 21 assembly.

FIGS. 5a–d show the action of the individual sprocket teeth on the sprocket assembly 19 with the roller 21C riding in the pin 21B which is contained in the disc body 21A. This configuration maintains positive engagement of the sprocket assembly 19, while minimizing the wear of the sprocket, roller disc and chain.

The design of the roller disc 21 establishes to rolling contact during the engagement of the sprocket 19 assembly because of the matched pitch diameters of the complimenting units. In other words, any radially extending line intersecting the rotating axis of the sprockets 15A, 15B and intersecting the rollers 21C would also intersect a corresponding roller on the chain 14.

The drive 15A and idler sprockets 15B and the complimentary roller disc assembly 21 are centered about the centerline of their respective shafts (22A,22B) to maintain the concentric relationship to one another as well as matching the pitch diameters of each radial about the centerline.

The clutch/sprocket assembly 19 allows the pallet to travel at the chain travel rate on the multi-strand roller chain 14 as the clutch provides rolling resistance on the sprocket engaged in the roller chain 14. This action will continue until either a stop is energized or a proceeding pallet stops and requires that accumulation is necessary. In either case the clutch assembly allows sufficient slippage with regard to the sprocket that the chain 14 freewheels beneath the guide bar 20 and the sprocket 19A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention, as claimed.

What is claimed is:

1. A conveyor assembly comprising:
   an endless chain with first and second sprockets at opposing ends of the conveyor assembly, said chain configured to move a plurality of pallets along guide rails by engagement with a clutch sprocket on each pallet; and
   first and second rotatable roller discs fixed to, and sharing common rotating axes with, the first and second sprockets, respectively, said roller discs each comprising a disc body which supports a plurality of circumferentially spaced rollers, whereby the clutch sprockets are positively locked between the chain and the roller discs when the pallets travel with the chain around the first and second sprockets at the opposing ends of the conveyor assembly.

2. The conveyor assembly of claim 1, wherein said endless chain comprises a plurality of chain rollers similar to said rollers on the roller discs so that teeth of the clutch sprockets are engaged with the chain rollers and disc rollers while the pallets travel around the first and second sprockets thereby creating a continuous rolling engagement to provide smooth motion and minimize wear.

3. The conveyor assembly of claim 2, wherein the chain rollers have a pitch diameter matching the pitch diameter of the rollers on the roller disc to enable said positive locking of the clutch sprockets therebetween.

4. The conveyor assembly of claim 3, wherein each roller disc has a radius smaller than the radius of the first and second sprockets, the difference between the two radii being equal to the diameter of the clutch sprockets.

5. The conveyor assembly of claim 3, wherein each roller disc has a radius larger than the radius of the first and second sprockets, the difference between the two radii being equal to the diameter of the clutch sprockets.

6. The conveyor assembly of claim 1, wherein said endless chain is a multi-strand chain three links in widths.

7. The conveyor assembly of claim 1, wherein each said clutch sprocket is secured to the respective pallet by a bolt and a clutch assembly which is adjustable to allow selective freewheeling of the clutch sprocket with respect to the continuously running chain for stopping pallets on the conveyor assembly at loading and unloading stations, and for allowing pallet accumulation.

8. A method of transporting pallets around opposing ends of a conveyor assembly including an endless chain engaged with first and second sprockets at the opposing ends, wherein the conveyor assembly includes pallets which are coupled to the chain by clutch sprockets, the method comprising:
   providing rotatable roller discs secured to, and sharing common rotating axes with, the first and second sprockets, each roller disc including a disc body which supports a plurality of circumferentially spaced rollers; and
   positively locking each clutch sprocket between the chain and the rollers of the respective roller disc, and rotating the respective roller disc with the respective one of the first and second sprockets as the clutch sprocket is positively locked to thereby transport the clutch sprockets and pallets around the first and second sprockets with the movement of the chain.

9. The method of claim 8, wherein said endless chain comprises a plurality of chain rollers similar to said rollers on the roller discs so that teeth of the clutch sprockets are engaged with the chain rollers and disc rollers while the pallets travel around the first and second sprockets thereby creating a continuous rolling engagement to provide smooth motion and minimize wear.

10. The method of claim 9, wherein the chain rollers have a pitch diameter matching the pitch diameter of the rollers on the roller disc to enable said positive locking of the clutch sprockets therebetween.

11. The method of claim 8, wherein each said clutch sprocket is secured to the respective pallet by a bolt and a clutch assembly which is adjustable to allow selective freewheeling of the clutch sprocket with respect to the continuously running chain for stopping pallets on the conveyor assembly at loading and unloading stations, and for allowing pallet accumulation.

12. A method of transporting a component around a chain sprocket engaged an endless multi-strand chain, said component being coupled to the chain by a clutch sprocket, the method comprising:

providing a rotatable roller disc secured to, and rotatable with, the chain sprocket, the roller disc including a disc body which supports a plurality of circumferentially spaced rollers; and positively locking the clutch sprocket between one strand of the multi-strand chain and the rollers of the roller disc and rotating the roller disc with the chain sprocket as the clutch sprocket is trapped between the chain and the roller disc to thereby transport the clutch sprocket and the component around the chain sprocket with the movement of the chain.

13. The method of claim 12, wherein said component is a pallet in a conveyor assembly.

14. The method of claim 13, wherein each said clutch sprocket is secured to the respective pallet by a bolt and a clutch assembly which is adjustable to allow selective freewheeling of the clutch sprocket with respect to the continuously running chain for stopping pallets on the conveyor assembly at loading and unloading stations, and for allowing pallet accumulation.

* * * * *